Jan. 5, 1926.
J. L. PRICHARD
1,568,530
HARVESTER FOR COTTON BOLLS
Filed April 3, 1924
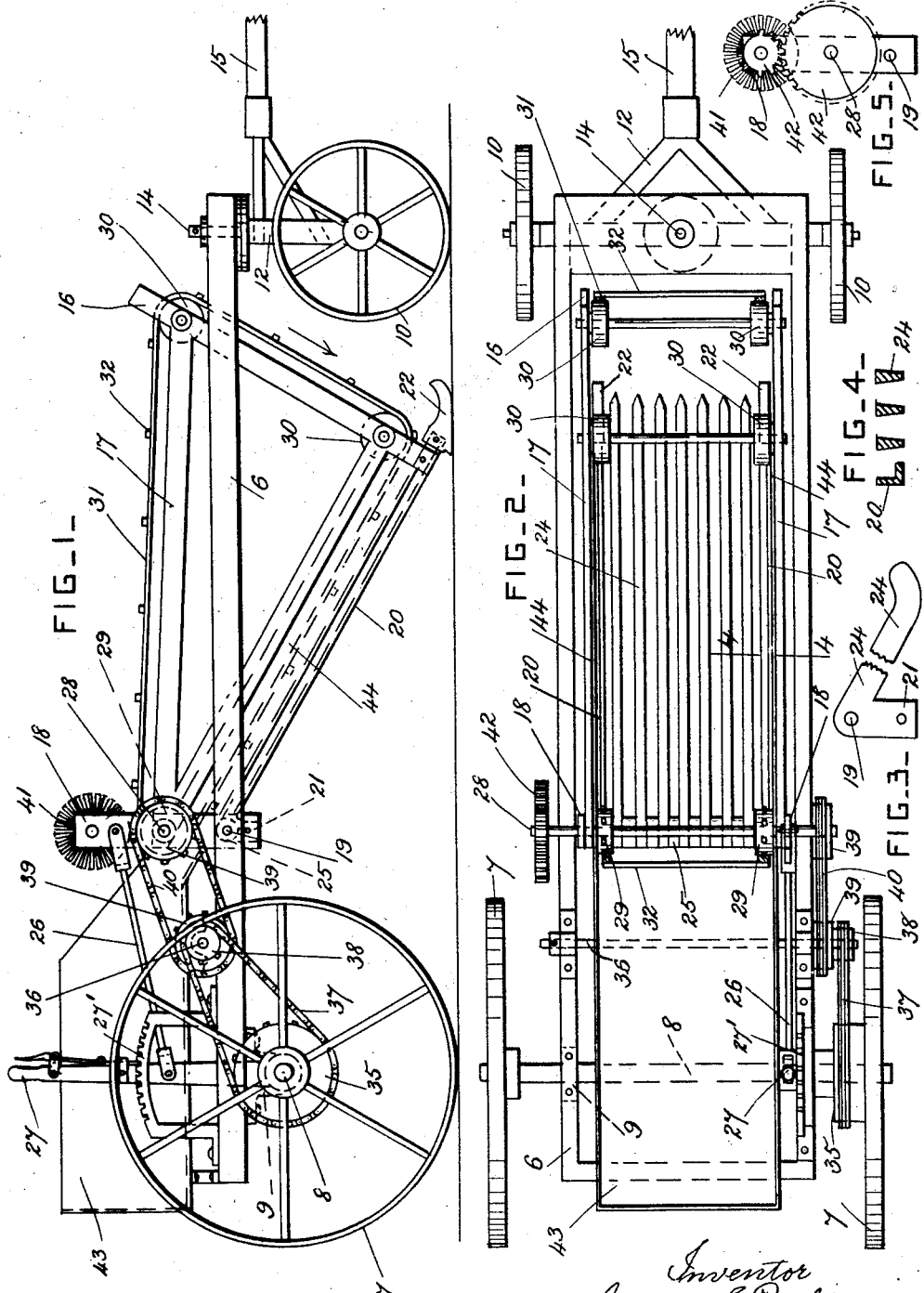
Inventor
Jordan L. Prichard
by Herbert W. T. Jenner
Attorney.

Patented Jan. 5, 1926.

1,568,530

UNITED STATES PATENT OFFICE.

JORDAN L. PRICHARD, OF CANYON, TEXAS.

HARVESTER FOR COTTON BOLLS.

Application filed April 3, 1924. Serial No. 703,882.

*To all whom it may concern:*

Be it known that I, JORDAN L. PRICHARD, a citizen of the United States. residing at Canyon, in the county of Randall and State of Texas, have invented certain new and useful Improvements in Harvesters for Cotton Bolls, of which the following is a specification.

This invention relates to machines for stripping bolls of cotton from the cotton plants; and it consists in the novel construction and combination of the parts hereinafter fully described and claimed.

This machine is used after the frost has killed the stalk portions of the cotton plants, and the bolls have opened, which in certain parts of the cotton growing country does not occur much before frost has come. The cotton plants grow in rows, and this machine is mounted on wheels so that it straddles the rows, and so that when the machine is drawn along it passes over the plants and strips off all the bolls and cotton, and loads them into a suitable hopper or a cart adjacent to the machine.

In the drawings, Figure 1 is a side view of a harvester for cotton bolls constructed according to this invention. Fig. 2 is a plan view of the same, with the cleaning brush omitted, and a portion of the conveyer broken away to show the stripping teeth. Fig. 3 is a side view of the end portions of one of the intermediate stripping teeth, drawn to a larger scale. Fig. 4 is a cross-section through some of the teeth, taken on the line 4—4 in Fig. 2. Fig. 5 is a detail of the driving wheels 42 and brush 41, looking at the left side of the machine in Fig. 2.

The machine is provided with a wheeled main frame 6 having rear wheels 7 mounted on an axle 8 which is carried by bearings 9 on the frame. The front wheels 10 are mounted in a separate frame 12 which is connected to the main frame by a vertical pivot 14. The draft pole 15 is connected to the front frame 12, and the animals walk between the rows of cotton plants. The machine may however be moved along in any other approved way, and it may be self-propelled.

A tilting frame 16 is provided, and its sides 17 are preferably arranged so that they form a triangular frame. The sides 17 have vertical plates 18 secured to them at their upper and rear angles, and the lower parts of these plates 18 are pivoted to the main frame by a pivot rod 19 which is arranged at a convenient distance in front of the rear wheels. Side teeth 20 are secured by downwardly projecting lugs 21 to the plates 18. These side teeth are preferably angle-shaped in cross-section, and they extend forwardly and downwardly, and have shoes 22 on their front ends which run on the ground a little behind the front wheels. The lower parts of the side teeth are secured to the sides of the tilting frame at its front end.

Intermediate teeth 24 are secured between the side teeth 20, and are arranged parallel to each other and to the side teeth, and are spaced apart and secured by means of similar lugs 21 and distance pieces 25. The lower ends of the teeth 24 are curved, and they are preferably of the cross-section shown in Fig. 4. All the teeth and the vertical plates 18 are rigidly secured together, and they all move pivotally on the pivot rod 19.

The teeth can be raised and lowered with relation to the ground by means of a rod 26 which is pivoted to one of the vertical plates 18, and an operating lever 27 which is pivoted on the rear axle, and provided with suitable catch mechanism 27'.

A driving shaft 28 is journaled in the vertical plates 18 above the pivot rod, and is provided with sprocket wheels 29. Guide wheels 30 are also provided, and are journaled at the other two angles of the triangular tilting frame. An endless conveyer 31 formed of flexible bands and crosspieces 32 is supported by the wheels 29 and 30, and its lower stretch is arranged to work substantially parallel to the stripping teeth. The front stretch of the conveyer is preferably arranged at a right angle to the lower stretch, so that it is inclined to the vertical with its upper part in advance of its lower part.

The conveyer is driven in the direction of the arrow in Fig. 1, by any approved driving mechanism. A sprocket wheel 35 is secured to one of the rear ground wheels 7, and drives a countershaft 36, by means of a drive chain 37 and a sprocket wheel 38. The countershaft 36 is connected with the driving shaft 28 by means of sprocket wheels 39 and a drive chain 40.

A gathering or cleaning brush 41 is journaled in the plates 18 above the driving shaft, and is revolved in the reverse direction to it by gear wheels 42, or other approved means. One wheel 42 is secured on the shaft 28 as shown in Figs. 2 and 5, and the other wheel meshes into it and is secured concentric with the brush 41. This brush removes any cotton and bolls which adhere to the conveyer, and the cotton and bolls are discharged into a chute or other receptacle 43 carried by the main frame. The countershaft 36 is provided to drive an elevator which discharges the cotton from the receptacle 43, and which is not a part of the present invention. Sheet iron plates 44 are secured to the tilting frame at each side, to prevent the bolls and cotton from slipping sidewise off the stripping teeth.

The bolls and cotton are stripped from the plants by the teeth as the machine is drawn over the plants, and the bolls and cotton are carried up the teeth by the conveyer, and are discharged at the rear end of the tilting frame. The shoes prevent the teeth from striking the ground, and permit them to be raised to any desired extent above it while passing over the plants.

What I claim is:

1. In a cotton harvester, a wheeled main frame provided with a pivot, uprights having their lower parts mounted on the said pivot, a triangular frame having its rear angle portion rigidly secured to the said uprights above their pivot, a series of teeth for stripping the cotton from the plants having their rear end portions rigidly secured to the lower parts of the uprights and projecting downwardly and forwardly, the lower side of the said triangular frame being arranged substantially parallel to the said teeth, a driving shaft journaled in the said uprights above their pivot, driving wheels secured on the said shaft, guide wheels journaled in the triangular frame at its front and lower angles, an endless conveyer carried by the said driving wheels and guide wheels and having its lower stretch arranged substantially parallel to the said teeth, and means which normally prevent the said uprights, triangular frame, teeth and conveyer from tilting on the said pivot.

2. A cotton harvester as set forth in claim 1, and having the side teeth of its said series of teeth secured at their lower end portions to the said triangular frame, and provided with means which limit the downward movement of the triangular frame and all the said teeth.

3. A cotton harvester as set forth in claim 1, and having vertical plates secured to the lower sides of the triangular frame and operating to prevent the cotton from sliding laterally off the said teeth at the sides of the conveyer.

4. A cotton harvester as set forth in claim 1, and having the upper end portions of its said series of teeth mounted on the said pivot and separated by distance pieces.

In testimony whereof I have affixed my signature.

JORDAN L. PRICHARD.